United States Patent [19]
Hernandez et al.

[11] Patent Number: 5,377,868
[45] Date of Patent: Jan. 3, 1995

[54] CONCRETE ADMIXTURE WEIGHING AND DISPENSING SYSTEM

[75] Inventors: Nelson Hernandez, Sunrise, Fla.; Randall Fierke, Bridgeview, Ill.

[73] Assignee: W. R. Grace & Co.-Conn., New York, N.Y.

[21] Appl. No.: 86,422

[22] Filed: Jul. 2, 1993

Related U.S. Application Data

[63] Continuation-in-part of Ser. No. 732,251, Jul. 18, 1991, Pat. No. 5,224,626.

[51] Int. Cl.⁶ .................................................. B27B 7/00
[52] U.S. Cl. .......................................... 222/1; 222/77; 177/251
[58] Field of Search ................ 222/1, 77; 177/89, 152, 177/244, 251, 261, DIG. 9; 220/23.4, 23.2, 23.83, 23.6

[56] References Cited

U.S. PATENT DOCUMENTS

| | | | |
|---|---|---|---|
| 3,447,906 | 6/1969 | Zimmerli | 222/77 X |
| 3,750,890 | 8/1973 | Smith et al. | 220/23.4 X |
| 4,042,051 | 8/1977 | Ricciardi | 177/DIG. 7 |
| 5,038,973 | 8/1991 | Gmur | 177/244 X |
| 5,224,626 | 7/1993 | Hernandez | 222/1 |

OTHER PUBLICATIONS

Brochure entitled:"Single Vac System", Norstrom Fluid Handling, Ltd.
Brochure entitled:"Single Pad System", Norstrom Fluid Handling, Ltd.
Brochure entitled:"Twin Vac System", Norstrom Fluid Handling, Ltd.
Brochure entitled:"Twin Pad System", Norstrom Fluid Handling, Ltd.
Brochure entitled:"Microflow 2000 System", Norstrom Fluid Handling, Ltd.
Brochure entitled:"Microcell 2000", Norstrom Fluid Handling, Ltd.
Brochure entitled:"Pneumatic Dispensing System for Liquid Concrete Admixtures", Norstrom Fluid Handling, Ltd.

*Primary Examiner*—Gregory L. Huson
*Attorney, Agent, or Firm*—Nicholas P. Triano, III; William L. Baker

[57] ABSTRACT

Apparatus and method for dispensing admixtures based upon weight. One or more admixture storage containers are supported in one embodiment by a suspended platform, and in another embodiment by brackets. A weight sensing system such as a single load cell is used for weighing the contents of the admixture storage containers. The platform or brackets are arranged so that the load cell is responsive to less than 100% of the weight in the containers. The containers are filled to a predetermined weight, and the contents are dispensed from each container in series or simultaneously.

2 Claims, 6 Drawing Sheets

5,377,868

CONCRETE ADMIXTURE WEIGHING AND DISPENSING SYSTEM

This is a continuation-in-part of co-pending application Ser. No. 07/732,251, filed on Jul. 18, 1991, now U.S. Pat. No. 5,224,626, the disclosure of which is incorporated herein by reference.

BACKGROUND OF THE INVENTION

Conventional admixture dosing apparatus is based upon volumetric dispensing. Such volumetric dispensing equipment includes mechanical fluid meters, sight bottles as visual indicators and control elements associated therewith, bladder tanks and associated tubing, valves and pumps. Volumetric systems require consideration of the viscosity of the various fluids to be dispensed, which can vary considerably depending on temperature, etc. Mechanical fluid meters are often problematic due to their moving parts and chemical attack. Sight bottles are typically constructed out of steel or acrylic, and are calibrated. The sight bottles need to be located at the batching office, which usually requires that extensive tubing be run from the dispensing location to the batching office. Accordingly, elimination of the foregoing drawbacks of volumetric dispensing devices would greatly enhance the efficiency and economics of admixture dispensing.

In addition, in the ready-mix industry, the cement, sand, aggregate, and water are all weighed to determine the proper amount for batching. Volumetric dispensing of admixtures therefore presents an additional procedure, requiring additional hardware as well as operational and calibrational training of personnel. There would be synergies if the admixtures were weighed as are the other components in the industry.

SUMMARY OF THE INVENTION

The problems of the prior art have been solved by the instant invention, which provides an apparatus and method for dispensing admixtures based upon weight. In particular, the instant admixture dispensing system includes an electronic weight sensing system such as a load cell for weighing the contents of one or more admixture storage containers, and appropriate valves and fittings. In one embodiment, the instant admixture dispensing system includes a suspended platform on which the admixture storage containers are suspended. In another embodiment, the instant admixture dispensing system includes support brackets on which the admixture storage containers are supported.

Since the dispensing system is based upon weight, temperature is not an important consideration. Existing computer software for volumetric dispensing can be converted to weight dispensing applications simply by taking into account the specific gravity of the various fluids to be dispensed. The instant method and apparatus provide for an accurate, reliable, durable, cost-effective, easy to install and low serviceable dispensing system for concrete and related admixtures.

DETAILED DESCRIPTION OF THE INVENTION

Figure 1:
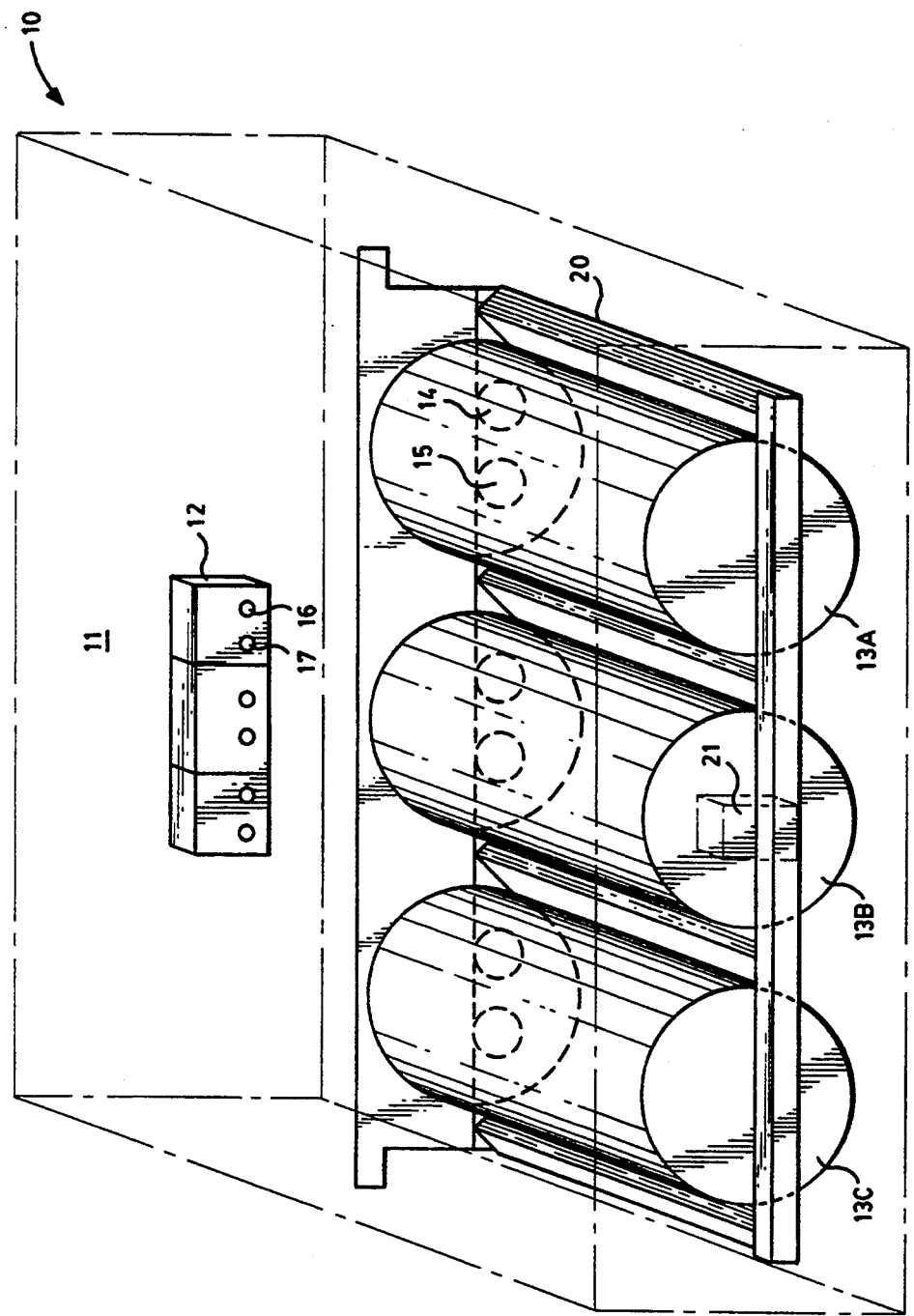
FIG. 1 is a perspective view of one embodiment of the admixture dispensing apparatus in accordance with the present invention.

Turning now to FIG. 1, there is shown generally at 10 a housing for the majority of the components which make up the instant admixture dispensing system. The housing 10 is conveniently in the shape of a box, and is preferably constructed of a lightweight and durable material such as aluminum. Preferably most of the connections from the dispensing equipment to the dispensing destination are on the outside of the housing 10, so as to minimize the accumulation of vapors, etc. inside the housing, and to minimize the load on the storage containers. The housing should have a cover (not shown) for enclosing its contents, since the system is usually used outdoors, and is sensitive to the elements. Attached to rear wall 11 of housing 10 by any suitable means is a fill and discharge manifold 12, which includes means to control air flow, such as electrically activated air flow control valves. Suitable valves for this purpose are "JOCK-A-MATIC air valves or SMC solenoid air valves. The air valves in turn activate ball valves, which control product flow. The manifold 12 is in fluid communication with each of the pressurized admixture storage containers 13a-13n through suitable flexible tubing (not shown). (It should be understood that although three admixture storage containers are shown, the system is expandable or reducible, depending upon the requirements of the particular case). Referring specifically to admixture storage container 13a, the tubing or piping connects to inlet and outlet fittings 14 and 15, respectively, and in turn is connected to inlet and outlet fittings 16 and 17 at the manifold 12 for filling and dispensing of the admixtures in each container, as discussed hereinbelow. Preferably the containers 13a-13n are constructed of ASME rated steel to satisfy OSHA requirements. Where no such requirements are present, PVC or other suitable containers may be used.

Figure 2:
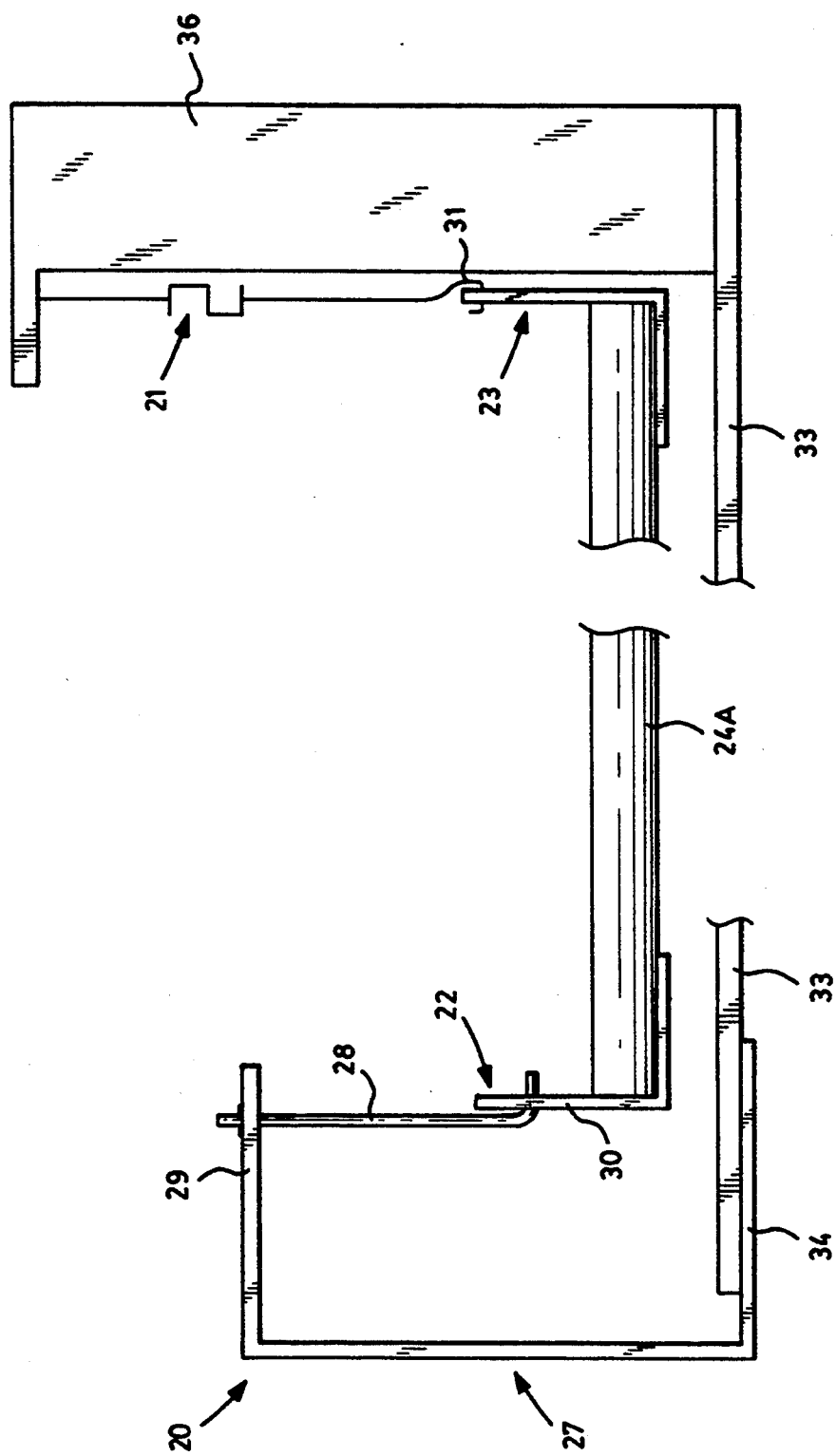
FIG. 2 is side view of a suspended platform that can be used in accordance with one embodiment of the present invention.
Figure 3:
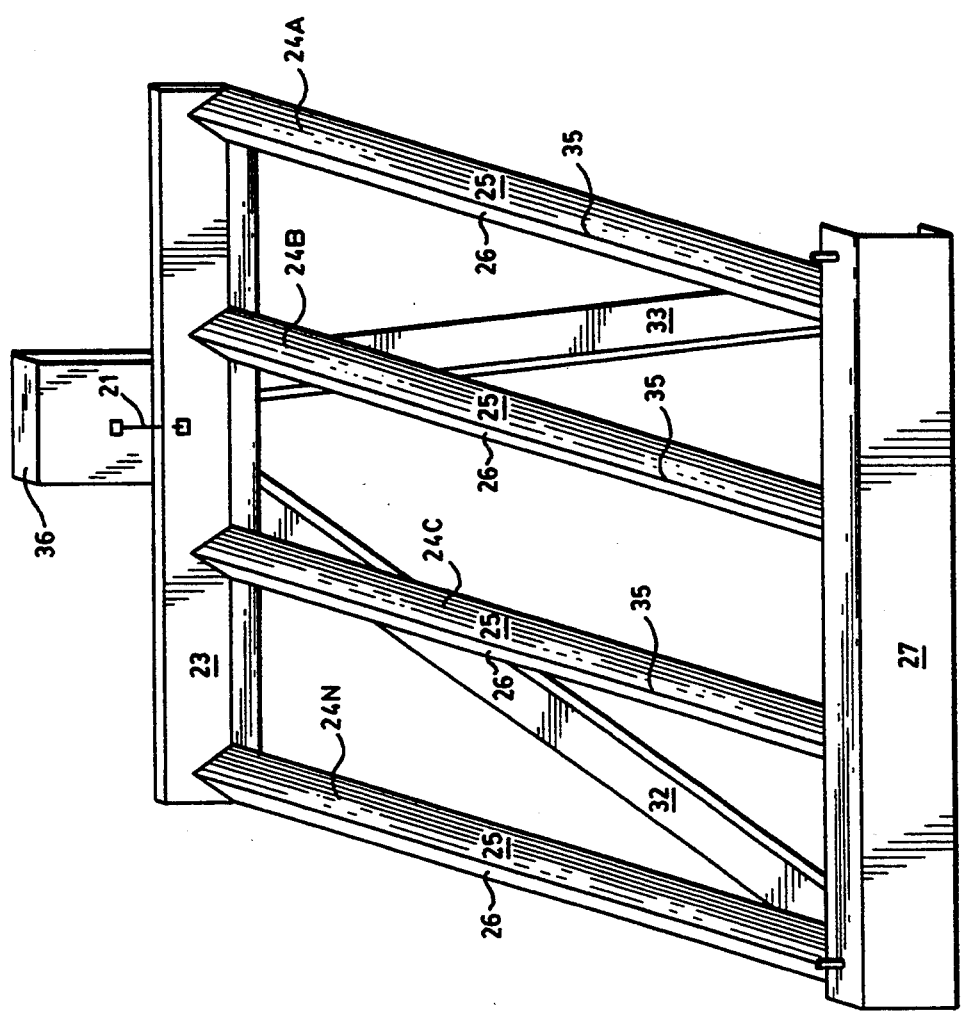
FIG. 3 is a perspective view of the suspended platform of FIG. 2.

In the embodiment illustrated in FIGS. 2 and 3, each of the storage containers 13a-13n are positioned on a self-contained suspended platform 20. The platform 20 includes an L-shaped front frame member 22 (FIG. 2) and an L-shaped rear frame member 23. The front frame member 22 is connected to the rear frame member 23 by a plurality of triangular trusses 24a-24n affixed at each end to the frame members 22, 23 by any suitable means, such as by welding. Each truss has a first face 25 and a second face 26 which meet at an apex 35. The pressurized containers 13a-13n (see FIG. 1) sit on said trusses such that each is supported by a first face 25 of one truss and a second face 26 of an adjacent truss. Although in the embodiment of FIG. 3, four trusses are illustrated, those skilled in the art will recognize that the number of trusses employed can vary depending upon the number of storage containers 13 to be supported.

FIG. 2 illustrates a C-shaped frame support member 27. Front frame member 22 is suspended from C-shaped support member 27 by any suitable means, such as by one or more hooked bolts 28 affixed through an aperture in the top leg 29 of the C-shaped support member 27 and an aperture in the vertical leg 30 of the L-shaped frame member 22. The L-shaped rear frame member 23 is supported by a weight sensing system such as one or more load cells 21 via hook 31 as can be seen in FIG. 2. The weight sensing system can be any system which senses weight, such as by detecting movement, and can include a spring, a cantilever beam system with a potentiometer, or a load cell. Preferably a single load cell is used. The load cell 21 senses variations in weight of the platform load. Suitable load cells include standard S-type cells made of stainless steel, or standard shear beam cells made of stainless steel. It is preferable that the load cell used be weather resistant. For purposes of the present embodiment, S-shaped load cells having a 250 pound capacity have been found to be appropriate. Those skilled in the art will recognize that the capacity of the load cell depends upon the amount of components to be weighed. Two cross members 32 and 33 are welded to the lower leg 34 of the C-shaped frame support member 27 at one end, and to the base of the load cell support housing 36 at the other end so as to form the self-contained support platform 20. Since one side of the platform 20 is supported by C-shaped member 27, the load cell measures only 50% of the load. As a result, a smaller, more economical load cell than would otherwise be required were 100% of the load being measured can be used. Those skilled in the art will recognize that the system can be modified so that the weight sensor measures any suitable proportion of the load less than 100%. Preferably the weight sensor measures 50% of the load. The containers 13a–13n are positioned on the platform depending upon the desired proportion of weight to be sensed by the load cell. For example, where 50% of the weight is to be sensed, the containers are centered on the platform. Suitable markings can be made on the trusses to indicate proper container placement.

Figure 4:
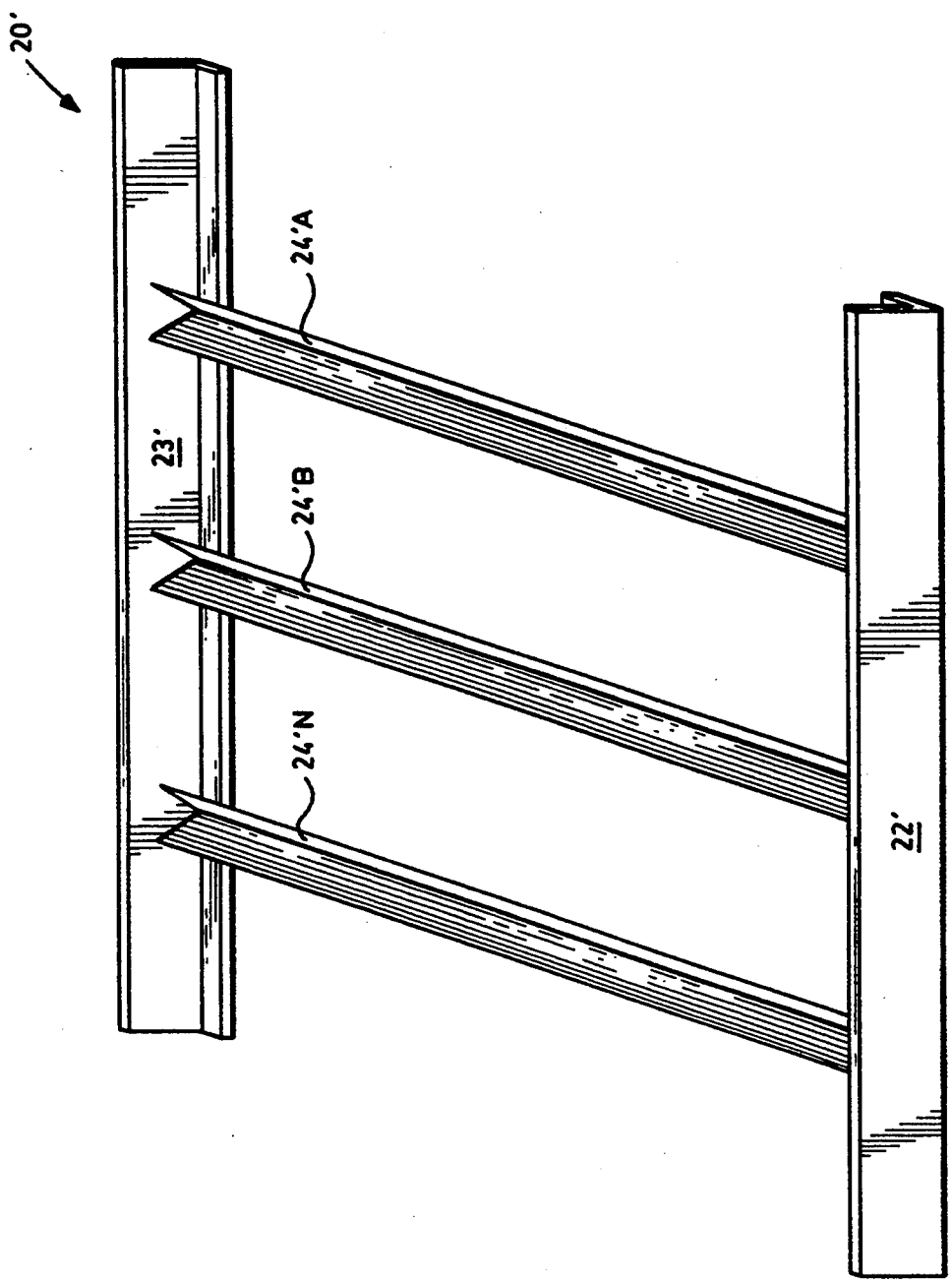
FIG. 4 is a perspective view of a platform that can be used in accordance with a second embodiment of the present invention.

Turning now to FIG. 4, there is shown a platform 20' in accordance with the a second embodiment of the present invention. An L-shaped front member 22' and a similar L-shaped rear member 23' are separated by trusses 24'a–24'n welded at each end to the front and rear members, respectively. The actual number of trusses will depend upon the number of containers to be supported by the platform 20'. A pair of leveling legs (not shown) support front member 22' above the floor or other surface on which the platform 20' is positioned. Preferably each leg supporting front member 22' is located near opposite ends of the member 22', and is adjustable for platform leveling purposes.

A shear beam load cell (not shown) is positioned under rear member 23' and supports the rear member 23' as well as 50% of the load on the platform 20. In this embodiment, the trusses 24'a–24'n have their apexes pointed downward, so that containers 13 (not shown) sit in the V-shaped groove formed by each truss, rather than in between two trusses as in the previous embodiment discussed hereinabove. It is critical that the platform be level and that the containers be centered on the platform to ensure that the load cell functions accurately. As in the previous embodiment, the weight proportion that the load cell senses can be changed by appropriately positioning the pressurized containers, i.e., by moving them left or right of center.

Figure 5:
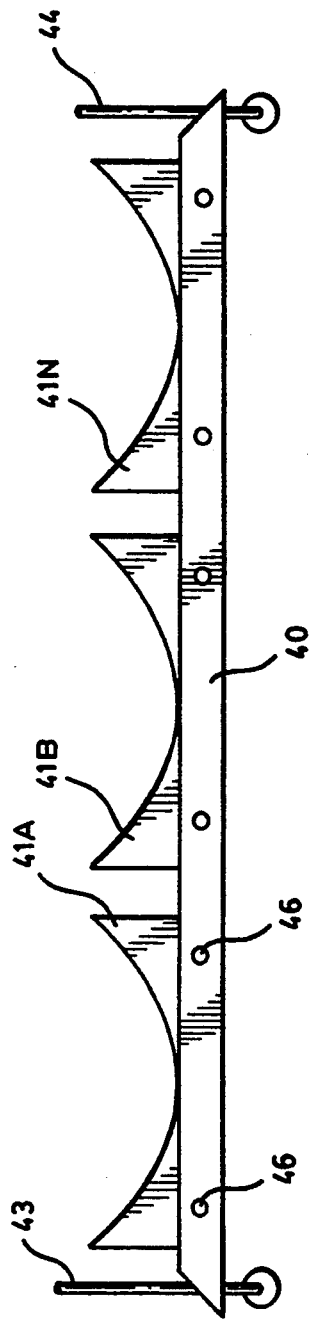
FIG. 5 is a front view of a front support bracket that can be used in accordance with a third embodiment of the present invention.
Figure 6:
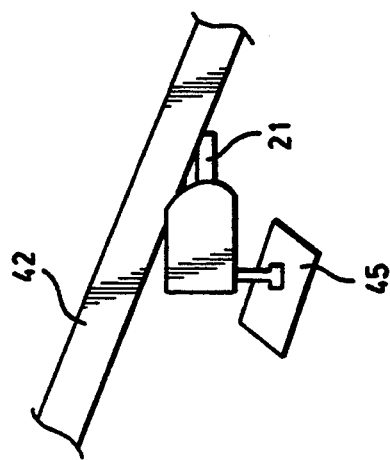
FIG. 6 is a partial view of a rear support bracket and load cell that can be used in accordance with a third embodiment of the present invention.

In the preferred embodiment of the present invention, the storage containers are supported by a rear L-shaped angle iron 40 having container brackets 41a–41n shaped to accommodate the storage containers, and by a similar front L-shaped angle iron 42 (with tank brackets not shown), as shown in FIGS. 5 and 6. The container brackets 41a–41n are attached to the angle irons by any suitable means, such as by bolts 46. The rear L-shaped angle iron 40 has leveling legs 43, 44 which are threaded, thus allowing vertical movement in order to level the supported containers. The front L-shaped angle iron 42 rests on load cell 21, which in turn can be supported by a support surface 45 such as a floor. As with previous embodiments, in this set-up the load cell measures 50% of the load. In this embodiment, the front and rear L-shaped angle irons are not connected, so that there is virtually no limitation for the size of the storage containers to be supported thereby.

Figure 7:
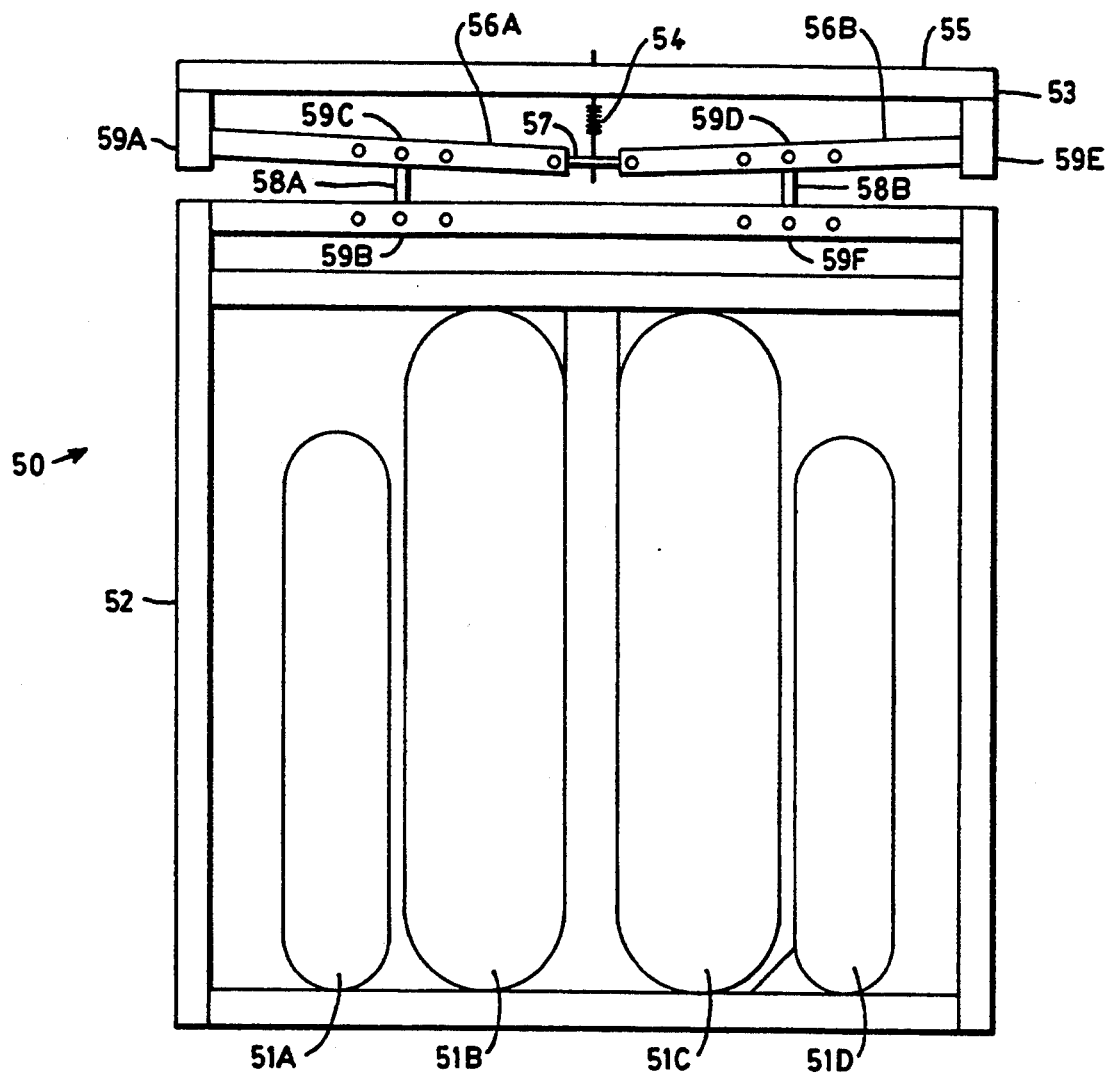
FIG. 7 is a front view of one embodiment of the invention having a self-contained suspended platform structure supporting admixture dispensing bottles in a space-saving vertical orientation.

Another embodiment of the invention is depicted schematically in FIG. 7, wherein at 50 is depicted a self-contained suspended platform structure comprising a container support means 52 and a support structure 53. Support structure 53 further comprises inverted u-shaped member 55, pivotable support arms 56A and 56B, and load cell 54. Load cell 54 is coupled to u-shaped member 55 and flexible coupling 57 (which also pivotably joins the free ends of pivotable support arms 56A and 56B) so as to support a proportion of less than 100% of the weight of the containers 51A–51D on container support means 52. Container support means 52 has a generally rectangular frame structure to accommodate admixture storage containers 51A–51D. The container support means should also desirably have means (not shown) for retaining the containers.

Container support means 52 is connected to, and thus suspended from, support structure 53 by tie rods 58A and 58B. Pivot points 59A–59F allow for free movement of pivotable support arms 56A and 56B, in turn allowing container support means 52 to move vertically in response to the weight change in container support means 52 caused by the flow of admixture into or out of any one of containers 51A–51D. As in the horizontally-aligned system disclosed hereinabove, when any or all containers 51A–51D are charged with admixture (via connections, not shown, at the top of the containers), the weight of container support means 52 increases and is measured by load cell 54. Admixture is dispensed through ports (not shown) communicating with and located at the bottom of containers 51A–51D.

This embodiment is advantageous in situations where space is at a premium; the vertical orientation of the containers allows the system to have a small "footprint". The vertical orientation of this embodiment also one to attach visually-calibrated sight tubes on the outside of the container(s), which, in the event of a load cell failure, would allow the containers to be filled manually. Although manual filling is not desirable, in the event of a load cell failure there would at least be no down time of the dispensing unit; certain state regulations also mandate such a backup system.

Another benefit of this embodiment is that when measuring small amounts of admixture, all of the admixture in the container(s) will be dispensed, because there is no holdup volume at the bottom of the containers, in distinction to the horizontally-oriented system, where residual admixture collects in a "heel" at the bottom of the angled horizontal containers, preventing the full discharge of small volumes. Another advantage of the vertical system is that any "wave action" inside the horizontal container, which can adversely affect the dispensing process, is eliminated in the vertical system.

In operation, the desired number of storage containers 13a–13n are appropriately arranged, either on the platform or support brackets, in association with the electronic weight sensing system, such as a load cell, adapted to sense variations in weight of the contents of said containers. When a particular admixture is to be dispensed, a desired preset weight is entered into a controller that controls the pressurized container filling valve. A suitable valve for this purpose is an air actuated ball valve. A signal is generated from the controller to open the filling valve to the pressurized storage vessel. The admixture is then pumped or gravity fed into a pressurized container on the platform. When the weight sensing system senses that the preset weight has been reached, a signal is sent from the controller back to the dispenser to close the valve. The proper amount of admixture is now in the pressurized storage container. The procedure is repeated for each of the admixture storage containers. Once the valve closes after loading the last storage container, a short settle time is allowed (e.g., 2–3 seconds) and a signal is sent to the dispenser fill and discharge air manifold to open the admixture discharge valve, as well as a pressurized air valve. The pressurized air blows the admixture from the pressurized container into the mixer or other destination point, until the pressurized container is empty. The amount of pressurized air used to blow the admixture out of the pressurized container is determined by a timer, set long enough to discharge a completely full pressurized container with a safety factor built in. Alternatively or in addition, the amount of pressurized air used can be determined by the weight sensing system and controller. For example, the air pressure can be responsive to the weight sensing system such that when the weight sensing system reads zero (or some preset value), indicating that the container(s) is empty, the air flow ceases. A timer can also be used so that the air flow ceases some short time after the weight sensing system indicates that the container(s) is empty, in order to ensure that the admixture is emptied out of the flexible tubing as well. When the time expires, a signal is sent to close the admixture discharge valve and the pressurized air valve. The admixtures can be dispensed in series or all at once. As few as one admixture can be dispensed in this way. There is no upper limit to the amount of admixtures that can be dispensed by using the apparatus of the instant invention. Check valves are preferably included to prevent back flow of materials, and quick exhaust valves are preferably included to permit a rapid relief of air pressure in the system.

What is claimed is:

1. An admixture dispensing system, comprising:
   a. one or more vertically-oriented admixture storage containers;
   b. means for supporting said one or more storage containers;
   c. weight sensing means associated with said means for supporting said one or more storage containers, said weight sensing means coupled to said means for supporting said one or more storage containers, so as to support a proportion of less than 100% of the weight of said one or more storage containers on said admixture storage container support means.

2. A process for dispensing admixtures based upon weight, comprising:
   a. arranging one or more admixture storage containers on admixture storage container support means in a vertical orientation, each of said admixture storage containers having fill means and discharge means associated therewith;
   b. supporting less than 100% of the weight of said admixture storage container support means on weight sensing means;
   c. filling said one or more of said admixture storage containers with admixture via said fill means to a pre-determined weight as measured by said weight sensing means;
   d. discharging said admixture from one or more of said admixture storage containers.

* * * * *